United States Patent [19]

Lange et al.

[11] 3,845,474

[45] Oct. 29, 1974

[54] CACHE STORE CLEARING OPERATION FOR MULTIPROCESSOR MODE

[75] Inventors: Ronald Edwin Lange, Phoenix; John F. Couleur, Scottsdale; Donald L. Pine, Phoenix, all of Ariz.

[73] Assignee: Honeywell Information Systems Inc., Waltham, Mass.

[22] Filed: Nov. 5, 1973

[21] Appl. No.: 413,089

[52] U.S. Cl. ........................ 340/172.5, 340/173 AM

[51] Int. Cl. ........................ G06f 15/16

[58] Field of Search .................. 340/172.5, 173 AM

[56] References Cited

UNITED STATES PATENTS

| | | | |
|---|---|---|---|
| 3,665,426 | 5/1972 | Gross et al. | 340/172.5 X |
| 3,670,307 | 6/1972 | Arnold et al. | 340/172.5 |

*Primary Examiner*—Raulfe B. Zache

*Attorney, Agent, or Firm*—Lloyd B. Guernsey; Edward W. Hughes

[57] ABSTRACT

In a multiprocessor data processing system, all processors must have access to certain communications tables stored in the main memory shared by the processors. Each processor has a cache store embedded within for its individual use. A cache store in one processor might contain data from the communication tables which is obsoleted by operations of a second processor. The cache store clearing apparatus invalidates its data information any time its processor accesses the communication tables. The cache store is cleared by resetting tag directory indicators, a round robin counter and a column full flag, for each column in a four level set associative tag directory to the cache store. The data in the cache store need not be cleared. Using the four level set associative tag directory permits the data information in the cache store to be invalidated by a 16 pulse burst of signals for 1K words of cache store directed to the tag directory indicators.

11 Claims, 8 Drawing Figures

| MC1 | MC2 | MC3 | POINTER | LEVEL FULL OR EMPTY |
|---|---|---|---|---|
| 0 | 0 | 0 | A | E |
| 1 | 0 | 0 | B | E |
| 0 | 1 | 0 | C | E |
| 1 | 1 | 0 | D | E |
| 0 | 0 | 1 | A | F |
| 1 | 0 | 1 | B | F |
| 0 | 1 | 1 | C | F |
| 1 | 1 | 1 | D | F |
FIG. 7
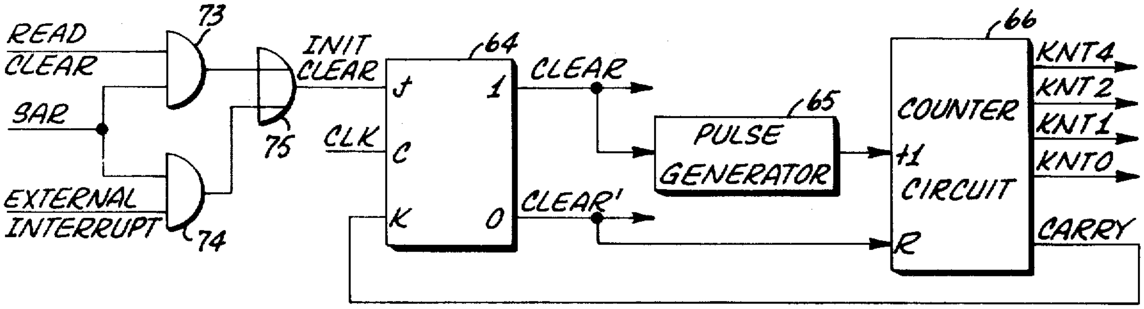
FIG. 8
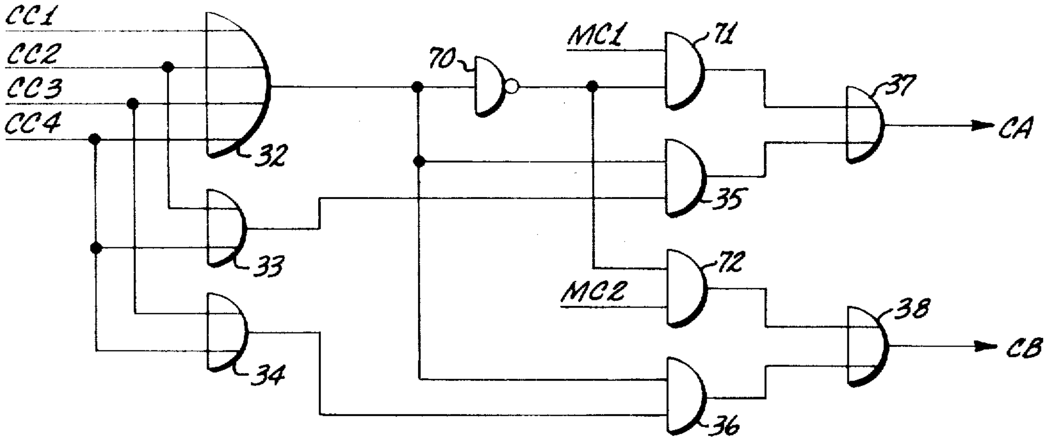
FIG. 5

CACHE STORE CLEARING OPERATION FOR MULTIPROCESSOR MODE

BACKGROUND OF THE INVENTION

This invention relates to electronic digital data processing systems and in particular to processors which incorporate a cache memory store having a very fast clearing operation that permits efficient operation in a multiprocessor mode.

1. Field of the Invention

One approach to improving memory performance in a data processing system is to superimpose a cache memory store onto the existing memory hierarchy, where the cache store is a fraction of the size of the main memory but much faster. Operands and instructions, hereinafter generically termed data, are fetched from main memory and stored in the cache store. The processor then accesses the cache store first for required data. If a cache memory store contains data which has been modified in the main memory, a provision must be made for periodically clearing out the cache memory.

An area of primary concern is that a computer system must insure that data in the cache memory is not invalid due to main memory being modified by concurrent I/O operations or other means. For a uniprocessor system, this consideration is not too serious a matter, being largely an extension of the requirements for permitting concurrent I/O operations is cache-less systems. With a single processor, most processing activities are essentially performed sequentially. However, with additional processors, an additional dimension to the problem is presented. For example, a common occurrence is for two processors, although processing unrelated programs, to need to use the same operating system module which has a set of instructions for which only a single processor can be given access at a time.

Gating apparatus is generally provided which, when shut by a first processor upon gaining access to the restricted set of instructions, causes a subsequent processor to perform other instructions or to loop using the modified gate instructions. When each processor has its own cache store, the modified instructions are loaded into its cache store and a lockup condition results because, when the first processor opens the gate, the instruction residing in the cache memory of the second processor is unmodified. For the converse, if the same gate shutting instruction is placed in two cache stores simultaneously, the first execution of this instruction by a processor will not shut the gate in the cache store of the other processor. This other processor will then not be prevented from entering the restricted set of instructions, contrary to system requirements.

2. Description of the Prior Art

A common cache store for incorporation in a processor uses a set associative mapping technique. A significant practical problem is caused by the frequent need for clearing the set associative cache store memory. However implemented, the replacement mechanism and the full/empty mechanism of the tag directory are in part essentially specialized high speed random access store units. In the prior art either the entire cache store or tag directory associative memory was cleared. An initialization or clearing of the flags requires that the full/empty flags be loaded with zeros using sequential steps for each block location in the tag directory pointing to a block of data in the cache store. Because it is necessary to frequently clear the cache memory, such a long clearing operation is intolerable. Accordingly, an object of the present invention is to provide an economical set associative cache store memory which can be cleared efficiently and quickly such that each processor in a multiprocessor system can clear its cache store upon entering the restricted instructed set without interfering with its further operations.

SUMMARY OF THE INVENTION

A data processing system is provided in which the absolute address preparation is performed with the high order portion of an effective data address and a base register in the usual manner. In parallel, a set of address tags are read from a cache tag directory addressed by the low order address portion which also identifies a corresponding set of data words in the cache store. The cache tag directory, the cache store, and the control logic are made a part of the central processor.

Associated with the tag directory is a status indicator apparatus providing a full/empty status indication of each addressed column of the tag directory rather than for each address location, that is, for each level of each column. The status indicator apparatus indicates the entry of valid data into the storage unit by decoding the storage unit storing the indicator status.

The storage unit with associated logic controls indicates the status of the cache store by storing the status of the address location stored in the tag directory. The storage unit stores an indication or flag of whether the cache store contains data information, that is, a full or empty status. The storage unit requires N+1 bits of information to supply the replacement procedure for each Nth power of two levels in one column of the tag directory. In the disclosed embodiment, N=2 since four levels are in one column of the tag directory and thus a three-bit storage unit is used. A clearing operation for the cache store is performed by addressing the storage unit indicator while preventing the storage of data therein. The "all zeros" in each storage unit indicate that the entire cache store is clear, i.e., contains no valid data.

Cache stores are effectively used in a multiprocessing mode by clearing the cache store anytime its processor executes a gating instruction or an external interrupt is requested and serviced by its processor. The gating instruction identifies the entry of the processor into a common operating system module of the main memory store.

It is, therefore, an object of the present invention to provide an enhanced clearing apparatus for emptying a cache store of valid data information.

It is a more particular object of the present invention to provide a clearing apparatus which clears the cache store by resetting level status indicators of a tag directory to the cache store.

It is another object to provide a cache memory store capability in a data processing system which supports multiprocessor configurations.

It is yet another object to provide an enhanced clearing apparatus for a cache store for operation in a multiprocessor mode requiring individual processors to access common communication tables for storage in the cache store without the possibility of having invalid data in the cache store.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein:

FIG. 5 is a logic diagram of the generation of a portion of the cache store address signals;

FIG. 7 is a table showing the consecutive steps taken by the indicator apparatus of FIG. 6; and FIG. 8 is a logic diagram of a cache store clearing circuit controlled by multiprocessor operations and controlling the indicator apparatus of FIG. 6.

DESCRIPTION OF THE PREFERRED EMBODIMENT

Figure 1:
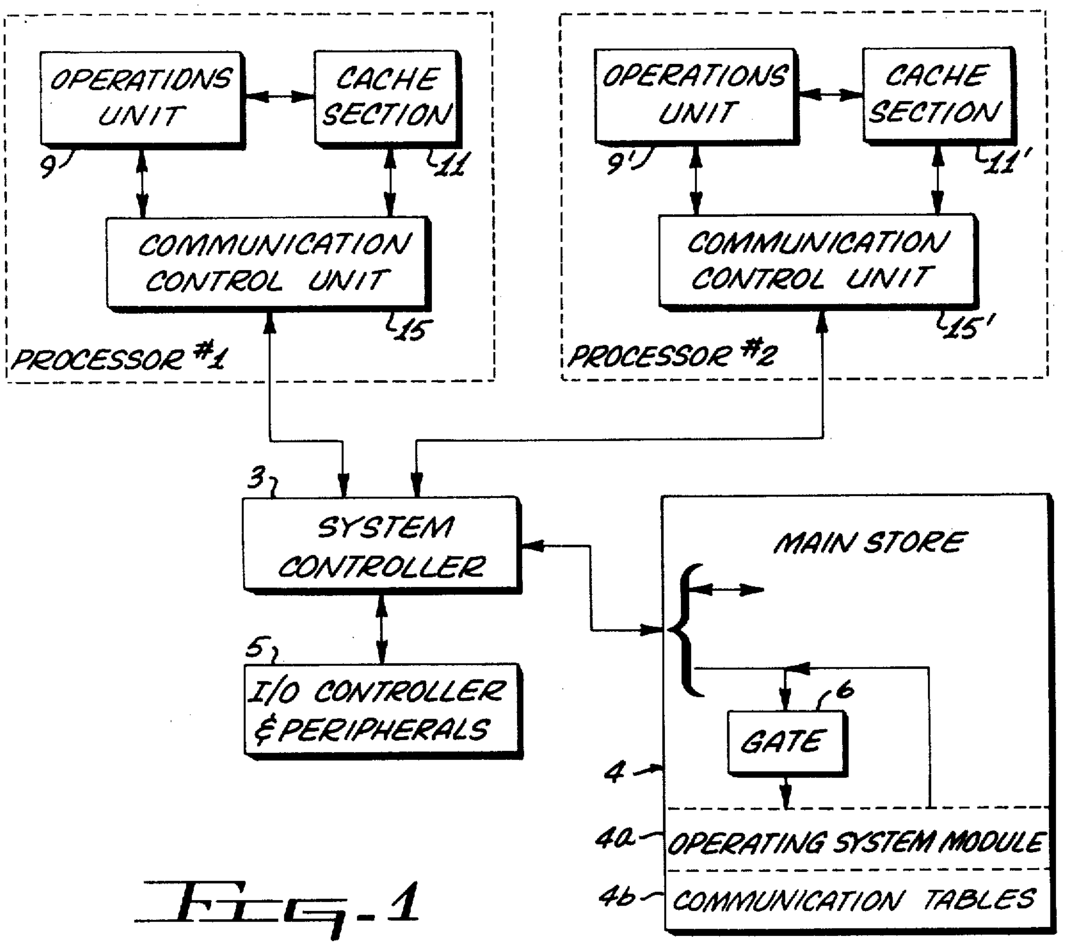
FIG. 1 is a block diagram of a multiprocessor data processing system including a cache store in each processor.

A representative multiprocessor data processing system configuration is shown in FIG. 1. The data processing system shown includes two processors No. 1 and No. 2, a system controller 3 controlling access to a main memory store 4 and controlling communication with a set of peripherals through a block 5 labeled I/O Controller & Peripherals. The system controller is connected to all of the processors in the multiprocessor data processing system to enable communications among the processors, the peripherals, and the main memory store. Each processor has access to the main store 4 and via a controlling gate 6 to an operating system module 4*a* and communication table 4*b* in the main store 4.

The gate 6 controls the access of the communicating devices such as the processors into the operating system module 4*a* and communication tables 4*b*. The gate 6 is symbolically shown as apparatus in the main store 4. In the preferred embodiment, the gate 6 is a software "gate" controlling the access by transmitting a blocking instruction to the processor requesting access while another processor is already communicating with the module 4*a* or the tables 4*b*. The blocking instruction will prevent access until the instruction is modified by first processor when communication is completed.

Figure 2:
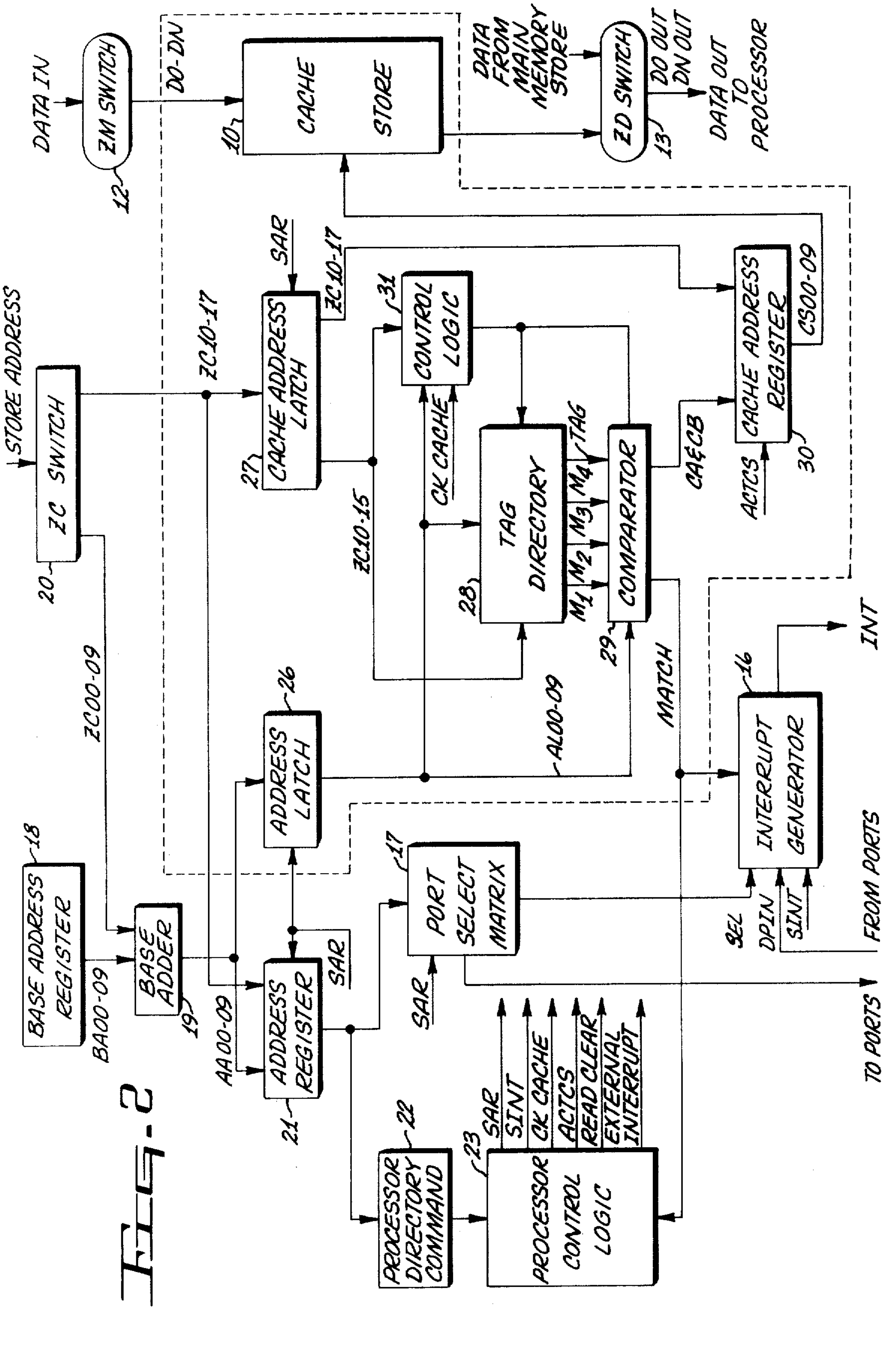
FIG. 2 is a block diagram of a communications control apparatus and a cache section of one of the processors shown in FIG. 1.

Each processor of the multiprocessor system, processor No. 1 for example, includes an operations unit 9 performing arithmetic and logic functions on operands fetched from the main memory store 4 in accordance with instructions also fetched from the main store 4. The interface functions of the processor 1, including preparation of absolute data addresses, are performed by a communication control unit 15. Each processor according to the present invention includes a cache store and associated control logic shown as a cache section 11 in the processor 1. A block diagram of the cache section 11 including a cache store 10 and portions of the communication control unit 15 is shown in FIG. 2.

A cache store 10 is a "look-aside memory" or high speed buffer store. The cache store provides a fast access to blocks of data previously retrieved from the main store and possibly updated later. The effective access time in the cache store is obtained by operating the cache store in parallel to existing processor functions. Successful usage of the cache store requires that a high ratio of storage fetches for data information be made from the cache store rather than requiring that the processor address the main memory store directly. In any event, the search of the cache store for the possible quick retrieval of the data information should not delay the retrieval from the main store. The system according to the preferred embodiment checks the cache store while the generation of a potential retrieval from main store is being processed. If the data information is found in the cache store, the retrieval is blocked. The processor obtains the data information from the cache store in a much shorter period of time without the processor being aware of the source.

The standard data processor control section 15 includes the means for transferring data to and from the cache store 10, and input memory bus ZM switch 12, and a read allow circuit or output memory bus ZD switch 13, an interrupt generator circuit 16, a port select matrix circuit 17, a base address register 18, a base adder 19, a ZC switch 20 for controlling the store address input, an address register 21, and a processor directory command 22 and a processor control logic 23 blocks representing the control logic of the processor. The cache section 11, besides the cache store 10, includes an address latch register 26, a cache address latch register 27, a tag directory 28, a comparator 29, a cache address register 30, and associated counters and control logic shown as block 31.

During main memory store fetch cycles, the data information is distributed from the input memory bus for usage by the processor while at the same time the ZM switch 12 is enabled to allow storage into the cache store 10. On subsequent processor cycles, the cache store 10 is checked at the same time that a fetch from the main store 4 is being readied. If the data needed is already in the cache store, the fetch from the main store 4 is aborted by controlling the communications control unit 15. A cache read cycle is enabled by the processor directory command section 22, the ZM switch 12 is disabled and the ZD switch 13 is enabled to transfer the data information from the cache store 10 directly to the processor.

Figure 4:
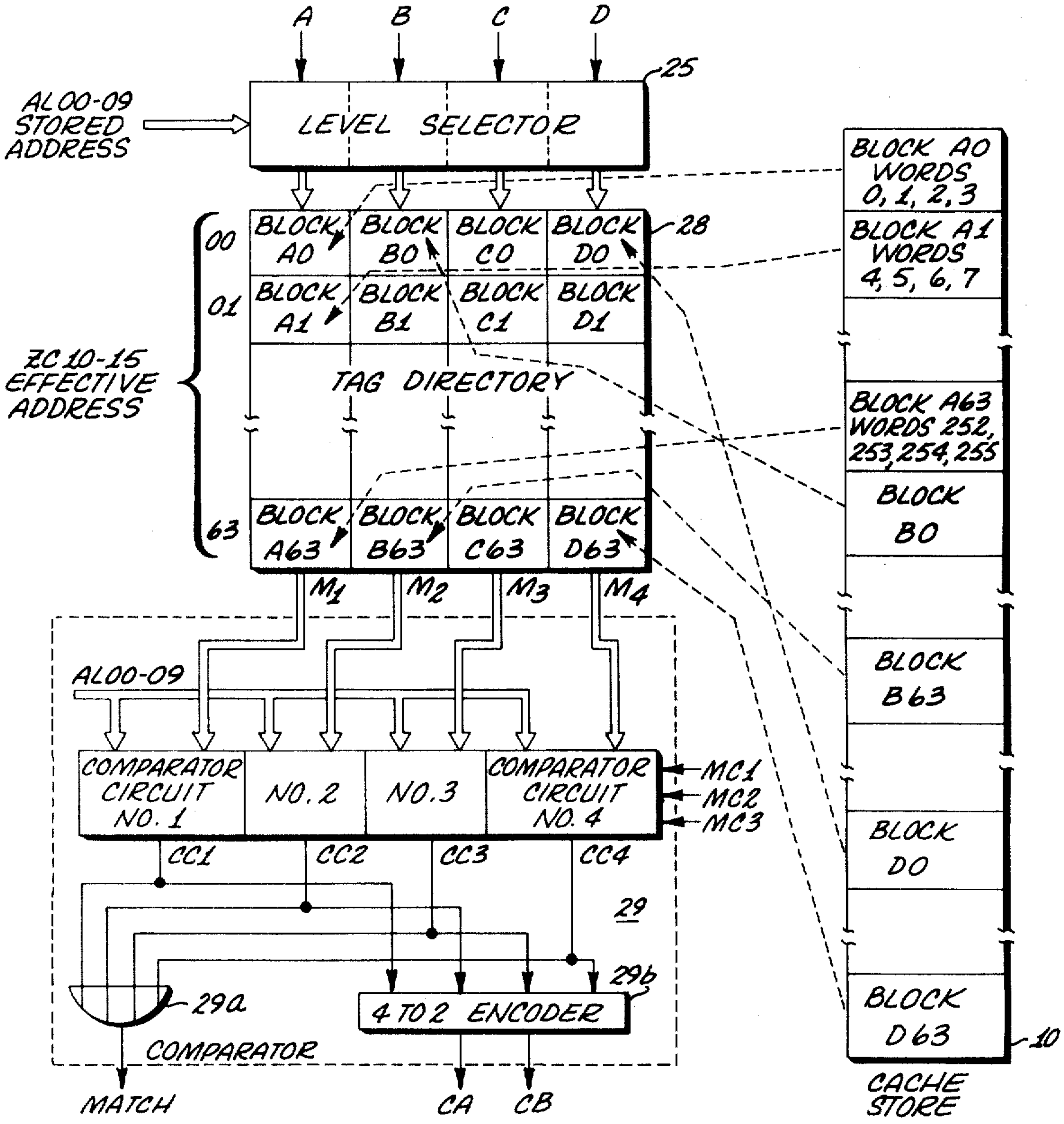
FIG. 4 is a block diagram of a tag directory with a comparator and shows the mapping strategy between the cache store and its tag directory shown in FIG. 2.

The cache or tag directory 28 identifies the storage section or block in the cache store 10. "TAG" words are stored in the tag directory 28 to reflect the absolute address of each data block. The mapping of the tag directory 28 according to the preferred embodiment is called a four level set associative mapping. The mapping organization is shown in FIG. 4. The tag directory is divided into N columns, 64 for example, to correspond to the number of blocks in the cache store. Each column has four levels. The cache store is divided into "N" of sections of 64 four-word blocks (256 words). Each block maps directly into a corresponding column of the directory. Each column of the tag directory then can contain addresses of four blocks, each from a different section. The replacement procedure for loading new blocks into a column which is full is on a first in, first out basis and is called round robin organization (RRO).

The tag directory 28 is implemented as a small memory with the number of locations equal to the number of blocks in the cache store. The low order address bit ZC10–15 of the effective address locate and access the columns of the tag directory 28, see FIGS. 2 and 3. Each tag word includes the high order address signals AL00–09 of the absolute address. The placement of high order stored address signals AL00–09 into the levels of the tag directory 28 is controlled by a level selector 25. The level selector 25 places the AL00–09 signals into the tag directory 28 according to the column location signals A–D from the round robin circuit (see FIG. 6). The level selector 25 could comprise four groups of AND-gates (not shown) with each group controlled by one of the column location signals. The control of the storage of the AL00–09 signals will be discussed later.

The cache store 10 of the preferred embodiment stores 1,024 data bits DO–DN in each chip section with each word length having 36 bits of information in each half of memory store, 72 bits of information in the combined sections. The cache store 10 has four levels accessed by the CA and CB address signals from the comparator 29. The readout data information signals D0OUT–DNOUT are common to all four levels.

Figure 3:
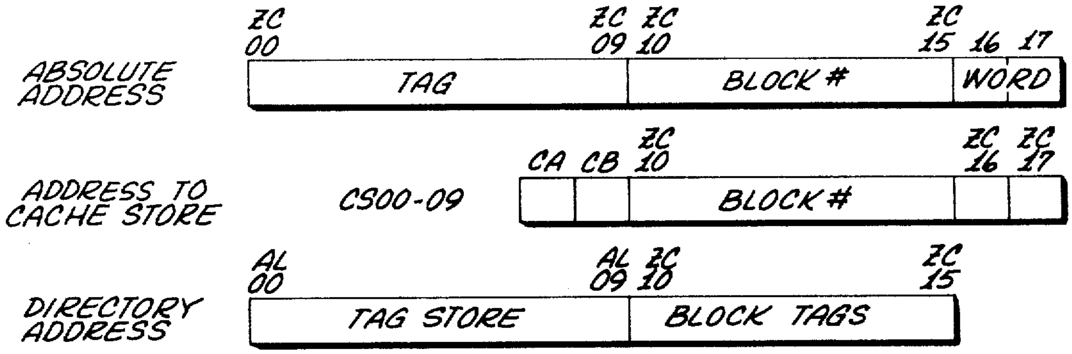
FIG. 3 is a diagram illustrating the addressing scheme used by the cache section shown in FIG. 2.

The cacho store 10 is addressed by the cache address signals CS00–09 made up from the low order address signals ZC10–17 together with the CA and CB signals, see FIGS. 2 and 3. The ZC16 and ZC17 signals signify whether the word addressed is in the upper or lower half of the memory block or whether a double word, both halves, is to be accessed at the same time.

The D0–DN data signals are the DATA IN signals, see FIG. 1, entered by the ZM switch 12, and the D0OUT–DNOUT signals are the DATA OUT signals transmitted to the main registers of the processor by the ZD switch 13.

Referring now to FIGS. 2 and 4, the data information stored in the tag directory 28 is the main memory address of the data stored in the cache store 10. Only 10 address bits are shown stored in the tag directory 28, the AL00–09 address bits from the address latch register 26. Thus by addressing the column of the tag directory 28, by the effective address ZC10–15 signals, the block word information stored in the cache store 10 is obtained. The address information stored in the addressed column is compared in the comparator 29 to the main memory store address AL00–09 signals being requested by the processor.

The comparator 29 essentially is four groups of a plurality of comparing circuits, 10 in the present embodiment, which compares the 10 address signals from each of the four levels of the tag directory 28, the M1, M2 M3 and M4 signals, to the 10 address signals AL00–09. If a comparison is made by all the signals in any 10 signal comparator circuit No. 1, 2, 3 or 4 and provided the level contained valid data as indicated by the MC1, MC2 and MC3 signals, the comparator 29 generates a MATCH signal from an OR-gate 29*a* to inhibit interrupt generator 16 from generating an INT signal. The retrieval of data information will then be from the cache store 10 rather than from the main memory store.

The cache storage address signals CS00–09, see FIGS. 2 and 3, are developed from the comparator logic and the effective address and are stored in the cache address register 30. The 10 bit address provides access to a 1,024 word cache storage. The 10 bit address uses address signals CA and CB from the comparator 29, developed from the comparison bits CC1–4 from the tag directory 28, see FIGS. 4 and 5, and bits ZC10–17 from the effective address.

Referring now to FIGS. 4 and 5, a four to two encoder **29*b* of the comparator 29 comprises OR-gates 32, 33 and 34 encoding the comparison bit signals CC1–4 together with AND-gates 35 and 36. OR-gates 37 and 38 generate the address signals CA and CB either from the comparison bit signals CC1–4 on a read cache store operation or from the status signals MC1 and MC2 on a write cache store operation. An inverter 70 disables AND-gates 71 and 72 if any one of the comparison signals CC1–4 is enabled on a correct comparison. If no comparison signals are enabled, the AND-gates 71 and 72 each have one leg enabled in preparation of a write cache store operation. As will be discussed later in FIG. 6, the MC1 and MC2** signals designate the levels of the columns that are to accept the next data information address.

The address signals CA and CB are used to address the required level or chip select from one of the four words in the block of words in the cache store 10. The type of operation performed by the cache store 10 is controlled by activating either the ZM switch 12 or the ZD switch 13. A cache read operation is performed when a compare is signaled by the comparator 29 on a data fetch instruction. A data fetch instruction on which no comparison occurs will generate a block load command to load new data into the cache store 10. The usual processor cycles and fault and interrupt cycles do not affect the cache system and cause the processor directory command 22 to operate in manner as if the cache store did not exist.

Referring to FIG. 2, the processor communication cycle starts with the enabling of the ZC switch 20 to enter the store address signals into the communications control unit 15 and to load the base address into the base address register 18. Shortly thereafter the check cache store CK CACHE signal is activated if the processor cache store is to be used on this cycle. All cache cycles start with the generation of a strobe address register SAR signal. At this time the effective address bits ZC10–15 are stable and enable an immediate access to the tag directory 28. The SAR signal loads the cache address latch register 27, the address latch register 26, and the address register 21 via the ZC switch 20. Additionally, the SAR signal will store and hold or latch the effective address bits ZC10–ZC17 and the output bits AA00–09 from the base adder 19 into the address register 21 and the address latch 26. Both addresses are saved in the event a block load cycle is required.

The time between the SAR signal and the strobe interrupt SINT signal is the normal time for the selection of the port to be used for main memory communication. During the time that tag directory access is being accomplished by the effective address signals ZC10–15, the addition of base address bits BA00–09 from the base address register 18 to the high order effective address bits ZC00–09 from the ZC switch 20 is taking place in the base address adder 19. The store address ZC00–17 signals are generated by the processor to identify the data information required. The base address register 18 modifies the high order portion of the store address signals in the base adder 19 to identify the section of memroy store containing the data information. The absolute address bits AA00–09 from the base adder 19 are stored in the address register 21 and the address latch register 26 and are available for a comparison in the comparator 29 at the same time tag words M1–M4 are available from the tag directory 28.

The address signals from the address register 21 are directed to the port selection matrix 17 which encodes the address signals to activate one of the ports of its processing unit. The port selection matrix 17 generates one of the port select signals for activating a particular port upon the generation of the SAR signal. When the selected port is ready to transmit, it generates the port ready DPIN signal. The DPIN signal is directed to the interrupt generator 16 to generate the interrupt signal INT. The INT signal activates the system controller 3 and the main memory store 4 to obtain the required data information. The data information is transmitted on the input memory bus into the requesting processor via its ZD switch 13.

On operations when a correct comparison is made in the comparator 29 signalling that the high order address signals are in the tag directory 28 pointing to data in the cache store 10, the MATCH signal is generated by the comparator 29. The MATCH signal is generated between the time the strobe address register signal SAR is generated and the time that an interrupt signal INT is to be generated by the interrupt generator 16. The MATCH signal inhibits the generation of the INT signal when the selected port transmits a DPIN ready signal and a strobe interrupt signal SINT is generated by the processor control logic 23. The comparison match indicates that a retrieval of data information from the main memory store is not required because the data information is presently available in the cache store 10. The port cycle retrieving the data information from the main memory store is cancelled, and the data from the cache store 10 is used.

The MATCH signal enables the processor control logic 23 to generate an activate cache store ACTCS signal which is directed to the cache address register 30. The cache address register 30 addresses the location in the cache store 10 determined by the address bits ZC10–17 and the address signal CA and CB generated by the comparator 29 as a result of the comparison of the absolute address signals and the tag signals. The ZD switch 13 is then activated to allow the data information from the address storage location in the cache store 10 to be directed to its processor.

If a noncomparison is indicated by the comparator 29, the MATCH is not generated and the interrupt generator 16 generates an INT signal. The INT signal accomplishes the communication connection between the main memory store and the processor generated interrupt by activating the system controller 3. The system controller 3, in a manner well known, addresses the main memory store 4 according to the address stored in the address register 21. The data information is transmitted to this processor via the ZD switch 13 through the port selected by the port select matrix 17. The data information from the main memory store 4 is then retrieved and directed simultaneously to the processor and to its cache store 10. The data information is located in the cache store 10 and the address is placed in the tag directory 28 according to a first in, first out organization, the first data block placed into the cache store 10 is displaced by the new information.

As stated previously, the columns of the tag directory 28 are addressed and located by the effective address signals ZC10–15. Each column has four levels in which the stored address signals AL00–09 are stored pointing to a particular block in the cache store 10. In order to locate the particular level of the tag directory and the particular location of the data information in the cache store, a round robin organization RRO circuit is needed. Further a full/empty flag indicator is required to indicate the valid data information of each of the four levels.

To actually clear the data information from the cache store 10 would entail an elaborate logic circuitry. In addition, the time required to step through each of the locations of either the tag directory or the cache store would consume more time than is available to keep the operation of the cache store effectively hidden from the processor operations. The processor would have to be disabled for a period of time required to completely clear either the tag directory or the cache store. A three bit storage unit, a three bit memory cell chip, is provided for each column of the tag directory, see FIG. 6. This three bit storage unit provides the RRO counter to point to the particular level of the addressed column that the next data information is to be entered and also provides a flag indicator to indicate that all four levels contain valid data information and thus the new data information must be written over previously valid data information. This replacement of valid information by new valid information is effectively a presumption that the data that has been longest in the cache store is the least likely to be reused by the processor. Since information is replaced on a four location block basis, anticipation of further information generally occurs.

Figure 6:
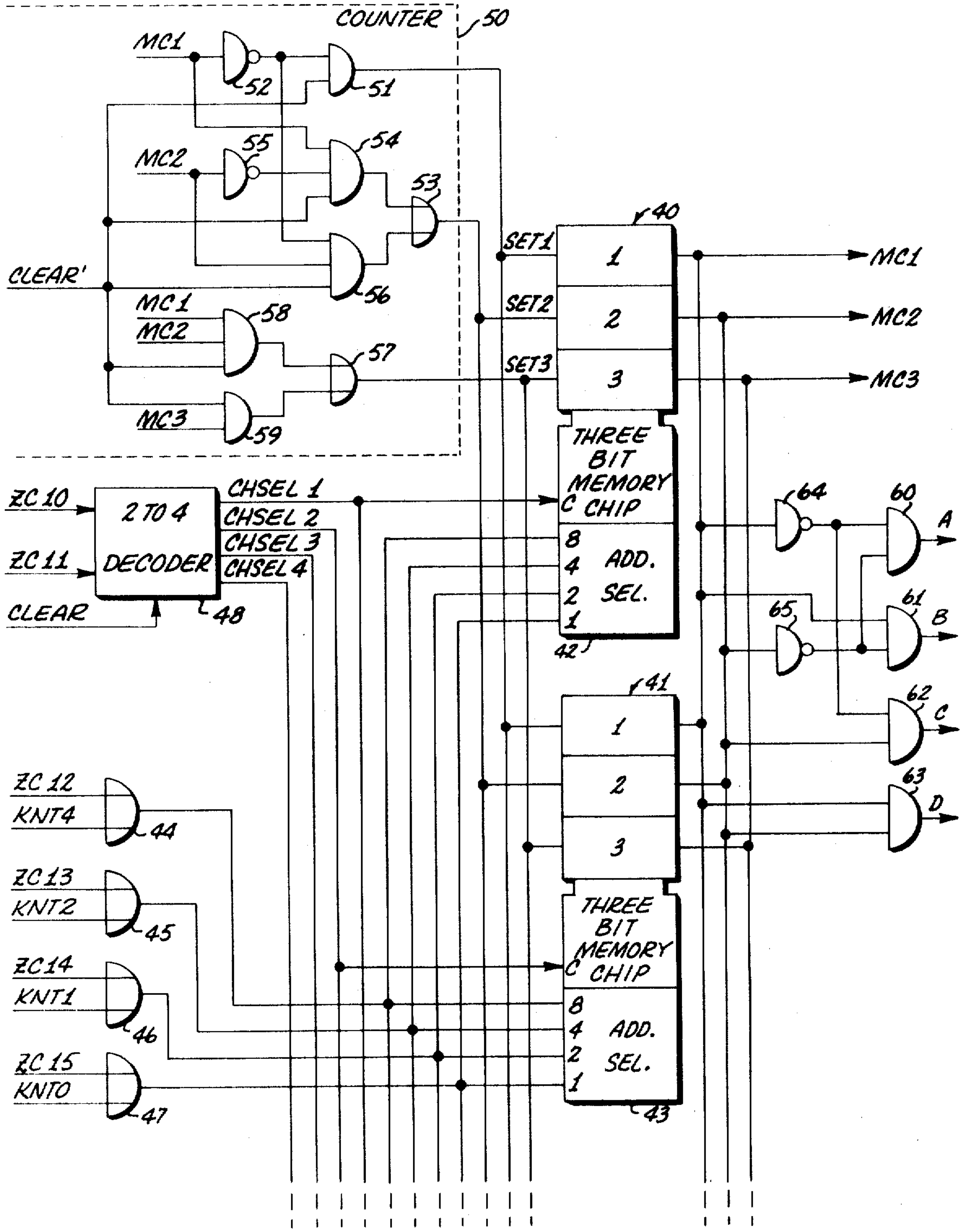
FIG. 6 is a logic diagram of the indicator apparatus control logic for the tag directory shown in FIG. 2.

Since the three bit storage unit includes stored information which is encoded to point in turn to each level of an addressed column and also includes a full/empty flag indicator for a particular column, the output signals MC1–3 of the three bit storage unit can be used to indicate valid data through logic circuit control of the comparator 29. To effectively clear the cache store the only requirement is that the three bit storage unit for each of the 64 columns be cleared. Further, in using the memory cell intergrated circuit chips, several can be enabled by a particular chip select signal to effectively clear a group of storage cells at one time. Thus, a portion of the effective address signal can be used to address a group of memory chips, in the present embodiment four at a time, and the rest of the effective address signals can address the remaining group, 16 in the present embodiment. Thus, 16 counts are required to effectively clear the entire cache store. The control logic of the present embodiment for providing a round robin counter and a full/empty indicator is shown in FIG. 6. A circuit usable for clearing the cache store by clearing the three bit memory chips is shown in FIG. 8. The logic circuit for providing the two address signals CA and CB from the RRO circuitry on a write cache store operation and from the comparator circuits No. 1–4, the CCl–4 signals (see FIG. 4), for a read cache store operation is shown in FIG. 5.

Referring now to FIG. 6, the RRO logic and the full/empty mechanism is shown. The RRO logic and the full/empty mechanism comprise a portion of the control logic 31 shown in FIG. 2 and control the placing and locating the data information in the columns of the tag directory and thus into a specified location in the cache store. Two three bit storage units 40 and 41 are shown in FIG. 6 comprising a portion of the 64 units included in the present embodiment. One three bit storage unit is required for each of the columns of the tag directory 28. Since the tag directory 28 of the present embodiment comprises 64 columns, 64 three bit storage units are required.

Three bit integrated circuit memory cell chips are shown comprising the three bit storage units 40 and 41. The three bit memory chips 40 and 41 include an address selection portion 42 and 43 driven by a group of four address selection OR-gates 44–47. A portion of the effective address signals ZC12–15 is applied to one leg of each of the four OR-gates 44–47. The other leg of the four OR-gates 44–47 is driven by clear address signals KNT0–4. The clear address signals are generated by the clearing circuit shown on FIG. 8. The operation of the clearing circuit will be explained later.

Continuing with the control logic 31 circuitry of FIG. 6, the address selection OR-gates 44–47 provide 16 possible address signals. The remaining two bits of the effective address signals, bits ZC10 and 11, are applied to a two to four encoder 48 to provide the chip select signals CHSEL1–4. Each chip select signal is directed to four three bit memory chips. Thus, the chip select signals in combination with the effective address signals ZC12–15 individually address all 64 of the three bit memory chips.

The three bits of information stored in all of the memory chips are obtained from a modified increment counter 50. The successive enabling of the stored RRO signals MC1–3 by the modified increment counter 50 is shown in the table on FIG. 7. Each time data information is written into the cache store 10, the three bit memory cell having the same column effective address is incremented according to the table. During a write cache store operation, the CLEAR signal is disabled and thus its inverted signal CLEAR' is high or enabled. A clear cache store operation resets all RRO signals MC1–3 to zero. On the first addressing of the particular three bit memory, memory chip 40 for instance, the RRO signals MC1–3 are read from the addressed memory chip 40 and applied to the modified increment counter 50. The SET1 signal will be enabled by an AND-gate 51 of the increment counter 50. The AND-gate 50 is enabled by the CLEAR' or not clear signal and the low MC1 signal applied to an inverter 52 whose output is applied to the AND-gate 51. The SET2 and SET 3 signals will be in a low or disabled state. The first bit in the addressed memory chip 40 is enabled. On subsequent addressing of the memory chip 40 the MC1 signal will be high and the SET2 signal will be enabled by an OR-gate 53 and the enabled signals applied to an AND-gate 54. The SET1 and SET3 signals will be low. The second bit is enabled and the pointer is set to point at level C of the tag directory.

On subsequent addressing of each particular memory chip, the bits are incremented in turn until both the first and second bits are enabled. On the next and all subsequent addressings, the SET3 signal is high via an OR-gate 57 enabled by either an AND-gate 58 having the CLEAR', MC1 and MC2 signals applied thereto, or an AND-gate 59 having the CLEAR' and the MC3 signal applied thereto. The third bit indicates that all four levels of the addressed column are full and that the associated cache store locations contain valid data. Up to the setting of the MC3 signal, only the levels lower than the pointer level can be assumed to contain valid data. Subsequent write operations to the same absolute address will update the cache store.

The MC1 and MC2 status signals are the pointer signals which set the level section of the tag directory and through AND-gates 71 and 72 and OR-gates 37 and 38, see FIG. 5, provide the two address signals CA and CB for the cache store 10. The MC1 and MC2 signals are encoded by a group of four AND-gates 60–63 on FIG. 6 to provide the column location signals A–D which along with the effective address signals ZC10–15 provide the particular level and column location in the tag directory 28. The column location signals A–D are directed to the level selector 25 (see FIG. 4) controlling the entry of the stored address signals AL00–08 into the tag directory 28. The column location signals point to the column of the tag directory that is to receive the next address of the data information to be stored in the cache store. On a clear or initialized operation, the MC1, and MC2 and MC3 signals from all of the three bit memory chips are cleared to all zeros. As data information is placed into the cache store and the address of the data information is placed in the tag directory, the round robin counter is incremented. Thus, with MC1 and MC2 equal to a zero, that is a low signal, see FIG. 7, the column pointer signal A is enabled via AND-gate 60 and inverters 64 and 65 and the stored address signals AL00–09 are placed into level A of the column called out by the effective address signals ZC10–15 (see FIG. 4). At the same time, still referring to FIG. 6, the effective address signals ZC10–15 activate an associated three bit memory chip to set the first bit. On the next cache store write operation addressing the same column of the tag directory, the stored address signals will be placed into level B of the address column.

The indication of valid data in the cache store is accomplished by affecting the generation of the MATCH signal from the comparator 29, see FIG. 3. The CC1 signal from comparator circuit No. 1 is enabled only if either the MC1 or MC2 or MC3 signal is enabled showing that valid address data exists in the A level. The CC2 signal from comparator circuit No. 2 is enabled only if either the MC2 or MC3 signal is enabled showing that valid address data is stored in the A and B levels. The CC3 signal from comparator circuit No. 3 is enabled only if the MC1 and MC2 signals are enabled or the MC3 signal is enabled showing that valid address data is stored in the A, B and C levels. The CC4 signal from comparator circuit No. 4 is enabled only if the MC3 signal is enabled showing that the column is full and all levels contain valid address data. The actual implementation of the logic in controlling the comparator 29 by the MC1–3 signals is obvious and is not shown in detail here. The binary bit storage unit associated with the tag directory column is addressed by the same address signals as the column and therefore the output signals from both are available at the same time.

To clear the cache store 10 the only requirement is to reset all of the three bit memory chips to an all zero position, that is, round robin signals MC1–3 are low or disabled. All three round robin signals in a low condition designate that no valid data is contained in the particular column by preventing an output from the comparator 29. All three bit store units are cleared to zeros after an initialized signal on a turn-on operation or after a clear operation where all of the data in the cache store effectively becomes nonvalid data information.

Referring to FIG. 8 for the clearing apparatus, on an initialized clear INIT CLEAR signal, a flip-flop 64 is enabled to enable the clear signal CLEAR. The CLEAR signal is directed to pulse generator 65 and to the two to four encoder 48 on FIG. 6. The output of the pulse generator 65 is directed to the ADD 1 input of a counter circuit 66. The output of the counter circuit 66 are the clear address signal KNTO–4 which are directed to the four address OR-gates 44–47 of FIG. 6. The counter circuit 66 provides an address count from zero through 15 to address the three bit memory cells of FIG. 6 each time the pulse generator 65 emits an enabling signal. While enabled, pulse generator 65 emits a continuous stream of pulses each separated in time by a time required to reset a store unit. Upon reaching a count of 16, a CARRY signal is enabled by the counter circuit 66. The CARRY signal is directed to the reset K terminal of the flip-flop 64 to reset the clearing operation and again enable the CLEAR' signal.

The INIT CLEAR signal activating the clearing operation is derived from a READ CLEAR signal and an EXTERNAL INTERRUPT signal directed to AND-gates 73 and 74 respectively. The outputs of the AND-gates 73 and 74 are directed to an OR-gate 75 whose output is the INIT CLEAR signal. The SAR signal applied to the AND-gates 73 and 74 provides the appropriate timing for the clearing operation.

The cache store clearing operation is activated whenever the data in the cache store of a processor contains possible erroneous data. The possible erroneous data may have occurred because the I/O controller changed the data in the memroy and this data may have been retrieved by the processor and stored in its cache store prior to the change by the I/O controller. Thus anytime an external interrupt occurs signalling that the I/O controller is requesting access to the processor and main store, an EXTERNAL INTERRUPT signal is generated which activates the clearing apparatus of FIG. 8 to clear the cache store.

Further as stated previously, there are times when more than one processor requires access to portions of the main store available to only one at a time. As shown in FIG. 1, the software gate 6 in the form of an instruction word is modified by the first processor, for example, processor 1, to gain entry to effectively "close" the gate. The gate 6 can be effectively "closed" by entering a "closed gate" instruction which causes the next processor, processor 2, to hold or perform another program awaiting a remodification by processor 1. The remodification effectivly "opens" the gate 6 and permits a communication connection between processor 2 and the operating system module **4*a* and communication tables 4*b*. However, the processor 1 may have changed the data in the communication tables 4*b*. This data could have been placed into processor 2 cache store prior to the change by processor 1. The standard procedure is for the data to be retrieved from the cache store if the address to the data is found in the tag directory. Thus some means must be provided to clear the cache store of processor 2 to force retrieval of the data information from the main store 4.** This clearing of the cache store is controlled by the READ CLEAR signal.

The READ CLEAR signal is a class of special instructions, LOAD A-CLEAR MEMORY. These special instructions force a transfer of the data from the addressed location of memory to a register in the processor 1 and then clear the addressed location. The cleared memory location is the modified memory location which "closes the gate" and prevents the processor 2 from entering the main store modules **4*a* and 4*b*. The READ CLEAR signal is activated and processor 1 cache store is cleared to accept fresh data since the communication tables 4*b*,** may have been changed in the previous access operation.

The processor 2 may loop on the "closed gate" instruction awaiting the opening of the gate 6 or it may perform other instructions. Upon completing its operations, processor 1 remodifies the instruction to "open" the gate and processor 2 can gain access. By providing an easy means and fast apparatus for clearing the cache store, the retrieval of new data is not delayed. The clearing is effectively hidden from the processor operation.

Referring again to FIG. 6, the CLEAR signal applied to the two to four encoder 48 enables all of the chip select CHSEL1–4 signals. Therefore, as each count from 0 to 15 is enabled by the counter circuit 66 to enable the KNT0–4 signals, four three bit memory chips are cleared at one time. The SET1, 2 and 3 signals are all disabled by the disabled CLEAR' signal applied to the modified increment counter logic gates 51, 54, 56, 58 and 59. Thus after the counter circuit 66 counts 16 counts, the entire cache store 10 is effectively cleared by clearing the round robin and full/empty mechanism thereby making all of the data information in the cache store invalid information.

The clearing of the tag directory and the cache store is performed by merely resetting the storage units. The pointer signal is reset to point to the A level of the tag directory and the round robin MC3 signal is reset to show that whatever data signals contained in the tag directory and the cache store are no longer needed.

Very high speed integrated circuit packages are used for implementation of the cache store 10 as well as the other store units, such as the tag directory 28. The cache store address, see FIG. 3, directs the addressing of the particular circuit package along with the particular word or part of word from each package. The particular addressing of the integrated circuit packages is well known in the art and will not be further explained here.

Thus what has been discussed is an embodiment of a communications control system embodying the principles of the present invention. There will be immediately obvious to those skilled in the art many modifications of structure, arrangement, proportions, the elements, materials and components used in the practice of the invention. For instance, a 1K cache store is included in the explanation of the preferred embodiment. It is obvious that by increasing the addressing bit signals by one bit doubles the address capability of the address signals and the usable cache store size to 2K. The size of the cache store 10 should not be taken as a limiting factor.

Also positive logic gates are shown in the present embodiment. It is obvious that it is within the skills of one versed in the art to substitute negative logic without departing from within this invention. The appended claims are, therefore, intended to cover and embrace any such modifications, within the limits only of the true spirit and scope of the invention.

We claim:

1. A clearing apparatus for a cache store located in each processor of a multiprocessor data processing system, said clearing apparatus of each cache comprising:

addressable storage units one associated with each column of a set associative, multi-level, multi-column addressable tag directory to its related cache store and activated by alike address signals as its associated column, each storage unit when set storing full/empty status indicator signals of each level of its associated column;

a count means connected to receive the status indicator signals from each storage unit for directing its output to said storage units for storage therein, said count means incrementing the status indicator signals when each storage unit is addressed by its address signals;

said storage units indicating valid data in its related cache store by the count status of said storage units in that levels lower than the level indicated by the status indicator signals points to valid data in the cache store and levels higher point to invalid data, with at least one status indicator signal indicating that all levels are full and contain valid data; and clearing means connected to said count means and said storage units for resetting the status indicating signals, said clearing means activated by an initiate clear signal generated by a signal allowing peripheral access to said data processing system and by a signal from its associated processor signifying access allowed through a gate into a restricted area of a main memory store of the data processing system.

2. A clearing apparatus as defined in claim 1 wherein the tag directory includes four levels for each column and each of said storage units stores three bits of information, two for the level count and one for the level full status indication.

3. A clearing apparatus as defined in claim 1 wherein said clearing means includes:

a pulse generator actuated by said initiate clear signal for generating a burst of pulses; and a counting circuit connected to receive and increment said burst of pulses for generating clearing address signals, said clearing address signals actuating said storage units in turn according to said counting circuit;

said initiate clear signal inhibiting said count means.

4. A clearing apparatus as defined by claim 3 wherein said initiate clear signal actuates several storage units at one time by activating an address decoder generating a chip address signal providing the highest order decoded address signals to said storage units.

5. A clearing apparatus for a processor contained cache store section in a multiprocessor data processing system with each processor including its own cache store section, said data processing system including a main addressable memory store having a gate to prevent more than one processor from gaining access to restricted areas of said main memory store, an I/O controller controlling peripheral access to the data processing system, and a system controller controlling communication among said plurality of processors, said I/O controller and said main memory store, each of said cache store sections including an addressable cache store, a tag directory addressable store associated to said cache store, said tag directory having a plurality of columns addressed by high order address signals with each column having a plurality of levels, each of said levels storing low order address signals pointing to data information in said cache store, and a level selector controlling storage into the levels of said tag directory, said clearing apparatus comprising:

addressable storage units, one associated with each tag directory column and actuated by the same address signals, each storage unit when set storing full/empty status indicator signals of each level of its associated column;

a count means connected to receive the status indicator signals from each storage unit for directing its output to said storage units for storage therein, said count means incrementing the status indicator signals when each storage unit is addressed by its address signals;

said storage units indicating valid data in its related cache store by the count status of said storage units in that levels lower than the level indicated by the status indicator signals points to valid data in the cache store and levels higher point to invalid data, with at least one status indicator signal indicating that all levels are full and contain valid data; and clearing means connected to said count means and said storage units for resetting the status indicating signals, said clearing means activated by an initiate clear signal generated by a signal generated by the I/O controller allowing peripherals access to said data processing systems and by a signal from its associated processor signifying access allowed through the gate into the restricted areas of the main memory store.

6. A clearing apparatus as defined in claim 5 wherein said clearing means includes:

a pulse generator actuated by said initiate clear signal for generating a burst of pulses; and a counting circuit connected to receive and increment said burst of pulses for generating clearing address signals, said clearing address signals actuating said storage units in turn according to said counting circuit;

said initiate clear signal inhibiting said count means.

7. A clearing apparatus as defined by claim 6 wherein said initiate clear signal actuates several storage units at one time by actuating an address decoder generating a chip address signal providing the highest order decoded address signals to said storage units.

8. A processor controlled cache store storing data information from a main memory store in addressable areas and located in each processor of a multiprocessor data processing system, said cache store comprising:

a tag directory addressable associated store having a plurality of columns with each column having a plurality of levels, said tag directory storing low order address signals in each level pointing to data information stored in said cache store with each column addressed by high order address signals;

a comparator having a plurality of comparing means arranged in groups, one group for each level of said tag directory, said comparator connected to receive the high order address signals of data information requested by its processor and for comparing these high order address signals with the high order address signals retrieved from each level of the column addressed by the low order address signals and received from the tag directory, said comparator generating on a correct comparison a match signal signifying that the data information is in the cache store and a portion of the cache address signal;

addressable storage units, one associated with each tag directory column, addressable by the same low order address signal as its associated column, each of said storage units storing a full/empty status indicator of each level of its associated column;

a count means connected to receive the status indicator signals from each storage unit for directing its output to said storage units for storage therein, said count means incrementing the status indicator signals when each storage unit is addressed by its address signals;

a level selector connected to receive the full/empty status indicators and the high order address signals for entering the high order address signals into the level of the addressed column according to the full-/empty status indicator using a round robin organization, said full/empty status indicator of the addressed column also applied to said comparator to control said comparator such that valid data in said cache store is indicated by the count status of said storage unit in that levels lower than the level indicated by the status indicator signal points to valid data in the cache store and levels higher point to invalid data, with at least one status indicator signal indicating that all levels are full and contain valid data; and clearing means connected to said count means and said storage units for resetting the status indicating signals, said clearing means activated by an initiate clear signal generated by a signal allowing peripherals access to said data processing system and by a signal from its associated processor signifying access allowed through a gate into a restricted area of a main memory store of the data processing system.

9. A processor controlled cache store as defined in claim 8 wherein said clearing means includes:

a pulse generator actuated by said initiate clear signal for generating a burst of pulses; and a counting circuit connected to receive and increment said burst of pulses for generating clearing address signals, said clearing address signals actuating said storage units in turn according to said counting circuit;

said initiate clear signal inhibiting said count means.

10. A processor controlled cache store as defined by claim 9 wherein said initiate clear signal actuates several storage units at one time by actuating an address decoder generating a chip address signal providing the highest order decoded address signals to said storage units.

11. In a data processing system including a plurality of processors, a main memory store storing data information is addressable locations and including a gate to prevent more than one processor from gaining access to restricted areas of said main memory store, an I/O controller controlling peripheral access to the data processing system, and a system controller controlling communication among said plurality of processors, said I/O controller, and said main memory store, wherein each of said plurality of processors includes a cache section comprising:

a cache store storing data information in addressable locations;

a tag directory addressable associated store having a plurality of columns with each column having a plurality of levels, said tag directory storing low order address signals in each level pointing to data information stored in said cache store with each column addressed by high order address signals;

a comparator having a plurality of comparing means arranged in groups, one group for each level of said tag directory, said comparator connected to receive the high order address signals of data information requested by its processor and for comparing these high order address signals with the high order address signals retrieved from each level of the column addressed by the low order address signals and received from the tag directory, said comparator generating on a correct comparison a match signal signifying that the data information is in the cache store and a portion of the cache address signal;

addressable storage units, one associated with each tag directory column, addressable by the same low order address signal as its associated column, each of said storage units storing a full/empty status indicator of each level of its associated column;

a count means connected to receive the status indicator signals from each storage unit for directing its output to said storage units for storage therein, said count means incrementing the status indicator signals when each storage unit is addressed by its address signals;

a level selector connected to receive the full/empty status indicators and the high order address signals for entering the high order address signals into the addressed column of said tag directory and to the level of the addressed column according to the full-/empty status indicator using a round robin organization, said full/empty status indicator of the addressed column also applied to said comparator to control said comparator such that valid data in said cache store is indicated by the count status of said storage unit in that levels lower than the level indicated by the status indicator signals points to valid data in the cache store and levels higher point to invalid data, with at least one status indicator signal indicating that all levels are full and contain valid data; and clearing means connected to said count means and said storage units for resetting the status indicating signals, said clearing means activated by an initiate clear signal generated by a signal allowing peripherals access to said processing system and by a signal from its associated processor signifying access allowed through a gate into a restricted area of a main memory store of the data processing system.

* * * * *